United States Patent
Schmid et al.

(10) Patent No.: US 9,698,882 B2
(45) Date of Patent: Jul. 4, 2017

(54) RECONFIGURABLE SINGLE AND MULTI-SECTOR CELL SITE SYSTEM

(71) Applicant: ANDREW WIRELESS SYSTEMS GMBH, Buchdorf (DE)

(72) Inventors: Peter Schmid, Neuhausen (DE); Stefan Eisenwinter, Buchdorf (DE); Matthew Thomas Melester, McKinney, TX (US); Peter Gunzer, Monheim (DE); Michael Williamson, Clayton, NC (US)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 14/439,938

(22) PCT Filed: Nov. 26, 2013

(86) PCT No.: PCT/IB2013/060415
§ 371 (c)(1),
(2) Date: Apr. 30, 2015

(87) PCT Pub. No.: WO2014/083500
PCT Pub. Date: Jun. 5, 2014

(65) Prior Publication Data
US 2015/0304005 A1 Oct. 22, 2015

Related U.S. Application Data

(60) Provisional application No. 61/730,580, filed on Nov. 28, 2012.

(51) Int. Cl.
*H04M 1/00* (2006.01)
*H04B 7/0491* (2017.01)
(Continued)

(52) U.S. Cl.
CPC .......... *H04B 7/0491* (2013.01); *H01Q 1/246* (2013.01); *H04W 88/08* (2013.01); *H04W 24/02* (2013.01)

(58) Field of Classification Search
CPC . H04W 16/28; H04W 88/02; H04M 1/72519; H01Q 8/26
(Continued)

(56) References Cited

U.S. PATENT DOCUMENTS

| 4,369,520 A | 1/1983 | Cerny et al. |
| 5,493,306 A | 2/1996 | Rudish et al. |

(Continued)

FOREIGN PATENT DOCUMENTS

| DE | 19605374 | 8/1996 |
| RU | 2208808 | 7/2003 |

(Continued)

OTHER PUBLICATIONS

Alam et al., RF interference suppression using array beamforming, Abstract, 2004, 2 pages.
(Continued)

*Primary Examiner* — Danh Le
(74) *Attorney, Agent, or Firm* — Fogg & Powers LLC

(57) ABSTRACT

A telecommunications system is provided that is controllably operable as a sectorized antenna system and as an omnidirectional antenna system without requiring hardware reconfiguration. The telecommunications system includes a phase correlation measurement unit that can be between a sectorized antenna sub-system and a remotely located RF source site. The phase correlation measurement unit can be coupled to the RF source site over at least one feed line. The phase correlation measurement unit can output signals for controlling a phase shifter at the RF source site for phase shifting downlink signals and for causing operation of the
(Continued)

sectorized antenna sub-system as an omnidirectional antenna sub-system. In a sectorized operation mode, the phase correlation measurement unit and the phase shifter can be inactivated.

12 Claims, 9 Drawing Sheets

(51) Int. Cl.
  *H01Q 1/24* (2006.01)
  *H04W 88/08* (2009.01)
  *H04W 24/02* (2009.01)

(58) Field of Classification Search
  USPC .............. 455/422.1, 562.1, 550.1; 343/853
  See application file for complete search history.

(56) References Cited

U.S. PATENT DOCUMENTS

| | | | |
|---|---|---|---|
| 6,091,970 A | 7/2000 | Dean | |
| 6,198,435 B1* | 3/2001 | Reudink | H01Q 1/246 342/373 |
| 6,456,610 B1* | 9/2002 | Briley | H04B 7/0408 370/337 |
| 6,504,517 B1* | 1/2003 | Liu | H01Q 1/246 343/853 |
| 6,704,577 B1* | 3/2004 | Hughes | H04W 72/085 370/335 |
| 6,864,853 B2 | 3/2005 | Judd et al. | |
| 7,697,959 B2 | 4/2010 | Park et al. | |
| 8,090,329 B2 | 1/2012 | Viorel et al. | |
| 8,116,819 B2 | 2/2012 | Niu et al. | |
| 8,243,637 B2 | 8/2012 | Rege et al. | |
| 2003/0078075 A1 | 4/2003 | McNicol et al. | |
| 2004/0066902 A1* | 4/2004 | Fraser | G21K 1/025 378/145 |
| 2004/0116086 A1 | 6/2004 | Huttunen et al. | |
| 2005/0164744 A1 | 7/2005 | du Toit | |
| 2007/0247363 A1* | 10/2007 | Piesinger | H01Q 3/267 342/368 |
| 2008/0293451 A1 | 11/2008 | Haskell et al. | |
| 2008/0316105 A1 | 12/2008 | Seong et al. | |
| 2014/0105254 A1* | 4/2014 | Nienaber | H04L 1/206 375/219 |

FOREIGN PATENT DOCUMENTS

| | | |
|---|---|---|
| WO | 9609733 | 3/1996 |
| WO | 9637970 | 11/1996 |
| WO | 0232028 | 4/2002 |

OTHER PUBLICATIONS

Davidson, Omnidirectional transmitter combining antenna, Abstract, May 1983, 2 pages.

Eiges et al., Sectoral Phase-Mode Beams from Circular Arrays, 8 pages.

International Patent Application No. PCT/IB2013/060415, International Search Report and Written Opinion, mailed Apr. 15, 2014, 12 pages.

European Patent Office, "Office Action for EP Application No. 13826606.9", "from Foreign Counterpart to U.S. Appl. No. 14/439,938", Jun. 2, 2016, pp. 1-4, Published in: EP.

European Patent Office, "Office Action for EP Application No. 13826606.9", "from Foreign Counterpart to U.S. Appl. No. 14/439,938", Jan. 13, 2017, pp. 1-5, Published in: EP.

Eiges et al., "Sectoral Phase-Mode Beams from Circular Arrays", Mar. 1993, p. 8, Publisher: IEEE.

* cited by examiner

RECONFIGURABLE SINGLE AND MULTI-SECTOR CELL SITE SYSTEM

CROSS-REFERENCE TO RELATED APPLICATIONS

This is a U.S. national phase under 35 U.S.C. §371 of International Patent Application No. PCT/IB2013/060415, titled "Reconfigurable Single and Multi-Sector Cell Site System" and filed Nov. 26, 2013, which claims priority to U.S. Provisional Application Ser. No. 61/730,580 filed Nov. 28, 2012 and titled "Pseudo-Omni Site Configuration," the entire contents of each of which are incorporated herein by reference.

TECHNICAL FIELD

The present disclosure relates generally to telecommunications and, more particularly (although not necessarily exclusively), to cell site systems that are reconfigurable between omnidirectional and sectorized operation.

BACKGROUND

When a new cell site for wireless services (i.e., mobile communication) is established, the new cell site may be the first wireless coverage to be provided for the coverage area. When demand for more capacity increases at a later time and beyond the capabilities of the initial installation, the cell site infrastructure is often physically changed to provide the needed coverage capacity. Physical changes to the cell site infrastructure can include establishing smaller cells (i.e., more cell sites) or splitting a coverage cell into multiple sectors. Splitting a coverage cell into multiple sectors can involve less infrastructural changes than establishing multiple smaller cells, but it can still involve changing much of the initially installed hardware, e.g., antennas, feeding lines, feeding hardware, etc.

When an initial cell site with an omnidirectional coverage pattern (i.e., single sector) is changed to a multi-sector site for capacity, multiple items in the installation may need to be modified at significant cost. For example, an omnidirectional antenna may need to be replaced by a mufti-sector antenna (e.g., a three-sector antenna), a single coaxial feeder line may need to be upgraded to a multi-coaxial feeder line, and a full power feeding amplifier may need to be replaced with multiple feeding amplifiers (e.g., at one-third of full power each in the case of three sectors).

Mechanisms and systems are needed to more efficiently transform a cell site for providing higher capacity coverage for an area.

SUMMARY

In one aspect, a telecommunications system includes a phase correlation measurement unit. The phase correlation measurement unit can be between a sectorized antenna sub-system and a remotely located radio frequency (RF) source site. The phase correlation measurement unit can be coupled to the RF source site over at least one feed line. The phase correlation measurement unit can be configured for outputting signals for controlling a phase shifter at the RF source site for phase shifting downlink signals and for causing operation of the sectorized antenna sub-system as an omnidirectional antenna sub-system.

In another aspect, a method is provided that includes determining a rectified voltage signal of a combined signal formed from at least two downlink signals at a sectorized antenna sub-system site. The method further includes controlling a phase shifter at an RF source site for phase shifting downlink signals based on a measured voltage of the rectified voltage signal. The method further includes operating the sectorized antenna sub-system site as an omnidirectional antenna sub-system using at least two phase-aligned downlink signals.

In another aspect, a telecommunications system includes a phase shifter, antennas, and a phase correlation measurement unit. The phase shifter is positionable at a radio frequency (RF) source site. The antennas are positionable at a sectorized antenna sub-system site communicatively coupled to RF sources at the RF source site. The phase correlation measurement unit is positionable at the sectorized antenna sub-system site. The phase correlation measurement unit is configured for outputting signals for controlling the phase shifter for phase shifting system signals and for causing operation of the sectorized antenna sub-system site as an omnidirectional antenna sub-system. The telecommunications system is switchable between operating in an omnidirectional operation mode and a multiple sector operation mode in response to a control signal.

The details of one or more aspects and examples are set forth in the accompanying drawings and the description below. Other features and aspects will become apparent from the description, the drawings, and the claims.

DETAILED DESCRIPTION

Certain aspects and examples of the present disclosure are directed to establishing a cell site for initially operating as a single-sector cell site, but that is easily re-configurable to a multi-sector cell site at a later time without requiring replacement or upgrading of hardware. The cell site may also be re-configurable back to a single-sector cell site. Reconfiguration of the cell site can be controlled using commands from a software application rather that necessitating hardware changes.

A cell site system according to some aspects can include an antenna sub-system with antennas for multiple sectors. Each antenna can be associated with a respective feed line that is coupled to a dedicated radio frequency (RF) source, which may be located remotely from the antenna sub-system. Examples of RF sources include remote radio heads, distributed antenna system units, and base transceiver stations. In a single-sector mode, the RF sources provide the same signal to the cell site and the antennas radiate the same signal for providing coverage in the coverage area by an omnidirectional coverage pattern. The signals can be radiated in phase to each other and kept at a low group delay spread in providing omnidirectional coverage. For example, a phase detection box can be positioned between the antenna subsystem and a remote unit that can include one or more RF sources. The phase detection box can be coupled to the remote unit over one or more feed lines. The phase detection box can output control signals to phase shifters for phase shifting downlink signals and for causing the antenna sub-system to operate as an omnidirectional antenna sub-system.

These illustrative aspects and examples are given to introduce the reader to the general subject matter discussed here and are not intended to limit the scope of the disclosed concepts. The following sections describe various additional features and examples with reference to the drawings in which like numerals indicate like elements, but should not be used to limit the present disclosure.

Figure 1:
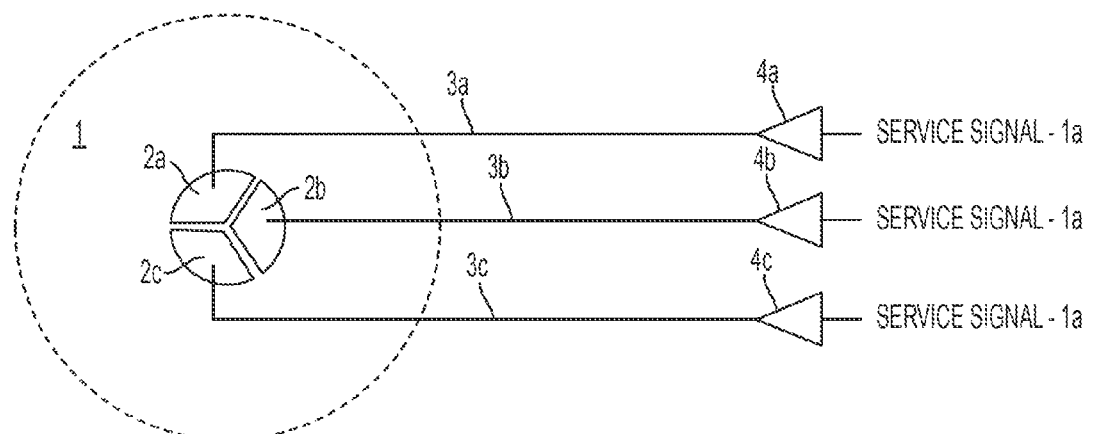
FIG. 1 is a schematic of a multiple sector telecommunications system operable as an omnidirectional antenna system according to one example.

FIG. 1 depicts an example of a multi-sector cell site that can provide a single-sector omnidirectional coverage pattern 1. The cell site includes an antenna subsystem with sectorized antennas 2a-c, one for each of three sectors. The sectorized antennas can radiate the same RF signal to provide the omnidirectional coverage pattern 1. The sectorized antennas can receive signals through feed lines 3a-c from RF sources represented by power amplifiers 4a-c. The RF sources can support the same service signal and the signal can be radiated by the sectorized antennas 2a-c such that the behavior of the system is like that of a single-sector cell site. Although three sectorized antennas 2a-c, three feed lines 3a-c, and three power amplifiers 4a-c (one power amplifier for each RF source) are shown by example, any number of each can be used.

The radiated signals can be phase matched to reduce or eliminate fading effects between the signals radiated by the sectorized antennas 2a-c. Phase matching can include keeping phase differences between the radiated signals to a minimum. A phase difference of more than thirty degrees, for example, can influence (e.g., through deformation of the coverage-pattern) a homogenous coverage. For example, the RF sources or power amplifiers 4a-c can have different phaseal behavior and the feed lines 3a-c can have different phaseal behavior such that keeping a feeding service signal (e.g., service signal 1a) phase matching may not be sufficient. Rather, the whole signal path may need to be analyzed and controlled. The phase correlation between the signals can be measured at the antennas 2a-c and a phase correlation can be adjusted according to the measurements to avoid fading effects at the pattern border of the antennas 2a-c. The adjustment of the phase correlation can be useful for initial system setup and to compensate phase drifts over time and based on temperature changes among other factors.

Figure 2:
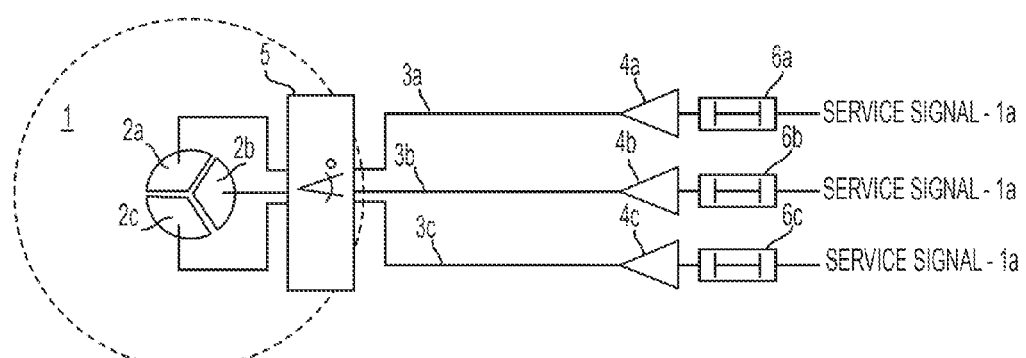
FIG. 2 is a schematic of a multiple sector telecommunications system with a phase correlation measurement unit and phase shifters according to one example.
Figure 3:
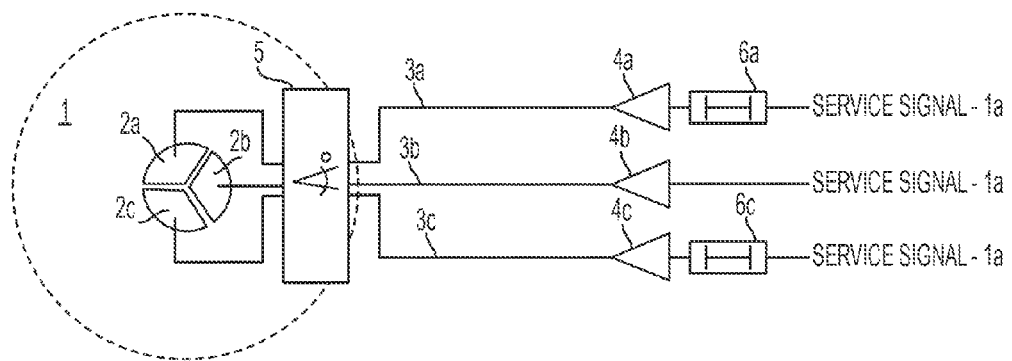
FIG. 3 is a schematic of a multiple sector telecommunications system with a phase correlation measurement unit and phase shifters according to another example.

FIG. 2 depicts an example of a multiple sector cell site system that can provide a single-sector omnidirectional coverage pattern 1. The system can include a phase correlation measurement unit 5 at the antennas 2a-c. The phase correlation measurement unit 5 can measure the phase difference between the signals on connections at feed lines 3a-b and the phase difference between the signals on feed lines 3b-c and the phase difference between the signals on feed lines 3a, 3c. The phase difference information can be used to control the phase shifters 6a-c in the signal path to adjust the phase difference to a minimum. The phase shifters 6a-c can be at the inputs of the power amplifiers 4a-c, or at any other point in the signal path to the antennas 2a-c. A phase shifter may be in every signal path or just in a subset of the used signal paths so that the neighboring sectors have an appropriate phase correlation. FIG. 3 schematically depicts an example of the multiple sector cell site system that includes three feed lines 3a-c and two phase shifters 6a, 6c. An example for a configuration where only a subset of the signal paths have a phase shifter is a three-sector configuration. It may be sufficient for the signal path for feed line 3a and the signal path for feed line 3c only to have a phase shifter, as shown in FIG. 3, while the signal path for feed line 3b is fixed. In this implementation, the signal path for feed line 3a can be adjusted to minimize the phase difference with the signal path for feed line 3b and the signal path for feed line 3c can be adjusted to minimize the phase difference with the signal path for feed line 3b such that the three signal paths can have a minimum phase difference with respect to neighboring signal paths.

The cell site system may be installed as a single sector antenna system providing omnidirectional coverage, but the system can be switched to a multi-sector antenna system without requiring hardware or other physical changes. The system can be reconfigured between a single sector antenna system and a multi-sector antenna system according to a switching signal. In multi-sector operation, the phase correlation measurement unit 5 and phase shifters 6a-c may not be operated since signals in multi-sector operation are sufficiently de-correlated and phase adjustment is not used. The phase correlation measurement unit 5 and phase shifters 6a-c, even though not in operation, can be retained in place such that hardware changes are not needed.

Figure 4:
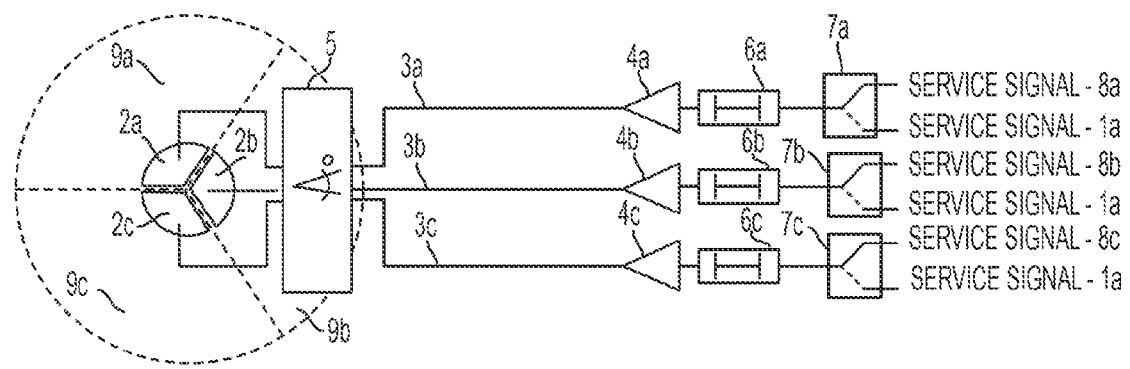
FIG. 4 is a schematic of a multiple sector telecommunications system with a phase correlation measurement unit, phase shifters, and switches according to another example.

FIG. 4 depicts an example of the cell site system in which three signals 8a-c for different sectors can be switched to three sectors 9a-c using switches 7a-c. The three signals 8a-c can be radiated as a three-sector configuration into different sectors 9a-c such that the cell site system operates as a sectorized antenna system. For example, the switches 7a-c can switch from providing service signals 1a, single-sector signals, to providing signals 8a-c along feed lines 3a-c through the power amplifiers 4a-c in response to a switching signal received from a control device communicatively coupled to the switches 7a-c. In some aspects, the switching signal can be communicated along the feed lines 3a-c to cause the phase correlation measurement unit 5 and phase shifters 6a-c to cease operation. The switching signal can be generated in a control device in response to a software application executing in the control device according to a user input or automatically upon detection of a specified event.

Phase correlation measurements according to various embodiments can be performed in various ways and using different types of component configurations.

Figure 5:
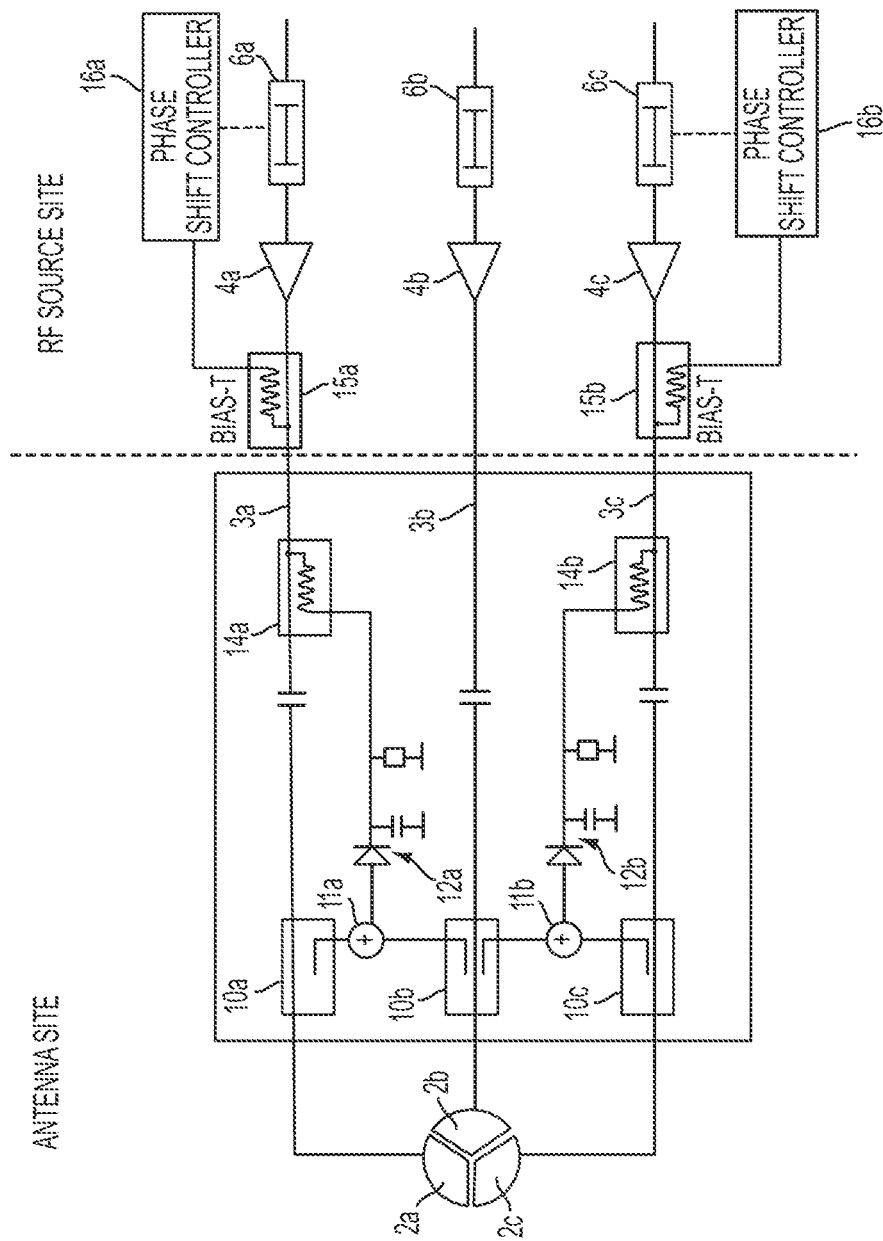
FIG. 5 is a schematic of a phase correlation measurement unit and phase shifters according to one example.

FIG. 5 schematically depicts an example of a phase correlation measurement unit 5 and phase shifters 6a, 6c in the cell site system according to one aspect. The signals from feed lines 3a-c can be de-coupled from the feed lines 3a-c by RF decouplers 10a-c. The de-coupled signals can be combined by combiners 11a-b. For example, a de-coupled signal from feed line 3a can be combined with a de-coupled signal from feed line 3b and combined by combiner 11a. A de-coupled signal from feed line 3c can be combined with the de-coupled signal from feed line 3b and combined by combiner 11b. The combined signals can be rectified by rectified circuitry 12a-b to form rectified voltages. The direct current (DC) rectified voltage can be coupled the feed lines 3a, 3c by DC on-couplers 14a-b and communicated toward phase shifters 6a, 6c on feed lines 3a, 3c. Bias-T circuitry 15a-b can de-couple the rectified voltages from the feed lines 6a, 6c. The phase shift controllers 16a-b can measure the rectified voltages and cause the phase shifters 6a, 6c to modify or retain the phase shift of the signals based on the measured voltages. For example, the phase shift controllers 16a-b can cause the phase shifters 6a, 6c to shift the phase of the signals until the measured voltages reaches a maximum as a maximum DC voltage can indicate a best phase-matching condition. A minimum DC voltage, in contrast, may indicate a condition in which two signals are, or are approximately, 180° out of phase.

In some implementations, signals from feed lines 3a and 3b are measured and phase shifted until a maximum DC voltage is detected. Then signals from feed lines 3b and 3c are measured and the signal for feed line 3c is phase shifted until a maximum DC voltage is detected. When signals from feed lines 3a and 3b are in phase and signals from feed lines 3b and 3c are in phase, signals from feed lines 3a and 3c are in phase.

The rectified voltages can be sent to the phase shift controllers 16a-b on the feed lines 3a, 3c to avoid additional wiring. But the rectified voltages can be sent to the phase shift controllers 16a-b through any communication channel.

The signals may be test signals. The test signals may be continuous wave (CW) signals, which may exclude effects of group delay differences on measurement accuracy. Any type of test signal can be used. In some aspects, the test signals can be modulated service signals transmitted during normal operation of the system. The modulated service signals can be combined and filtered using a bandpass filter to approximate the combined signal as a CW signal in reducing effects of group delay differences for measurement accuracy. The service signal can be approximated to a CW signal by the bandpass filter by the filter limiting the bandwidth of the signal such that group delay differences within the resulting bandwidth of the test signal can be close to zero, or otherwise negligible, which can be useful for measurement accuracy. The group delay differences among downlink signals may not be reduced.

Figure 8:
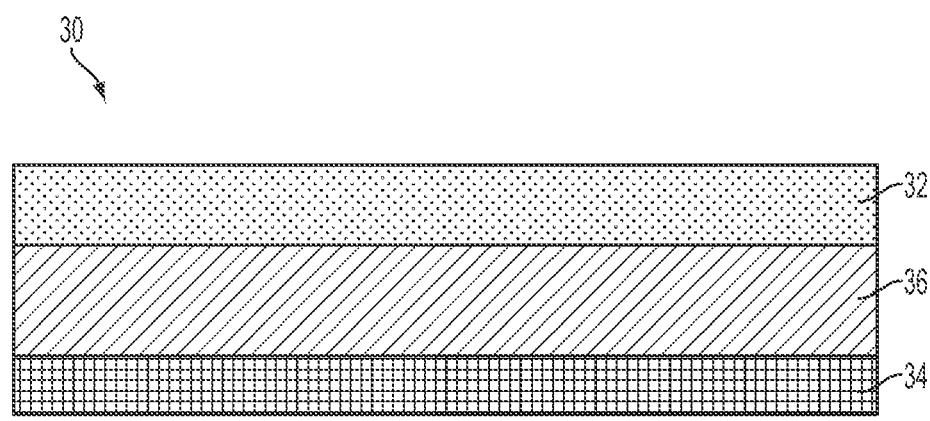
FIG. 8 is a side view of a module for a phase correlation measurement unit according to one example.
Figure 9:
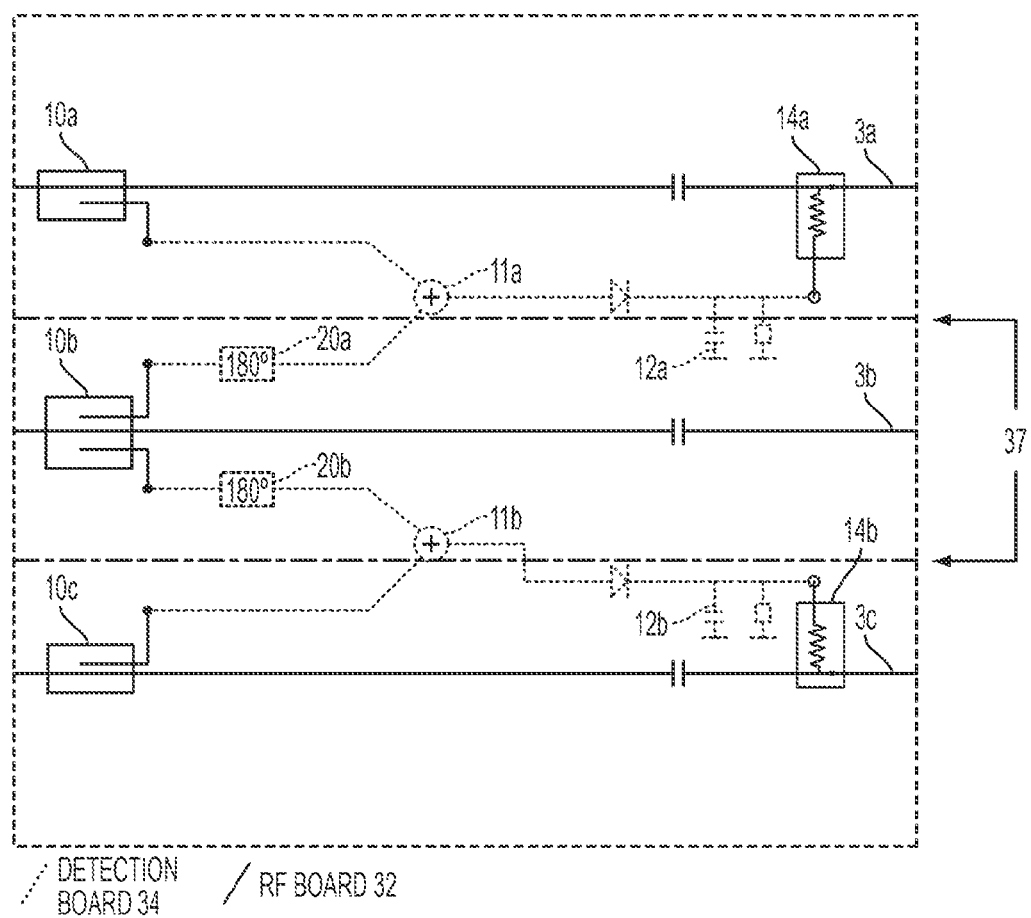
FIG. 9 is a schematic top view of a phase correlation measurement unit with representations of the boards on which components can be positioned according to one example.

The phase correlation measurement unit 5 may be a phase detection box that includes two boards: an RF board with high-quality factor material and a detection board that can have lower quality than the RF board. The phase correlation measurement unit 5 that includes the two boards can result in the phase correlation measurement unit 5 being a small size and providing high isolation and low insertion loss at a low manufacturing cost. FIG. 8 depicts a side view of an example of a module 30 for the phase correlation measurement unit 5. The module 30 includes an RF board 32, a detection board 34, and a metal plane 36 between the RF board 32 and the detection board 34 for isolating components on the RF board 32 from components on the detection board 34. FIG. 9 schematically depicts a top view of the phase correlation measurement unit 5 and illustrates the boards on which components can be positioned. For example, the components (i.e., feed lines 3a-c, RF de-couplers 10a-c, and on-couplers 14a-b) depicted with solid lines can be on the RF board 32 of FIG. 8 and components (i.e., combiners 11a-b, rectified circuitry 12a-b and 180° phase shifters 20a-b) depicted with dashed lines can be on the detection board 34 of FIG. 8. Further metal planes 37 on the RF board 32 can be positioned between the feed lines 3a and 3b and between the feed lines 3b and 3c, respectively, to increase isolation between the feed lines 3a-c.

The phase correlation measurement unit 5 can operate without requiring an external voltage supply. For example, the phase correlation measurement unit 5 can generate a DC voltage from the RF signals and can be powered from energy from the RF signals. In other embodiments, the phase correlation measurement unit 5 is powered by an external voltage by using at least one of the feed lines 3a-c for supplying the voltage.

The phase correlation measurement unit 5 can allow the phases of two or more RF signals to be automatically adjusted and correlated by relative measurements. In some implementations, absolute detected voltage can be less important unless a minimum or maximum voltage is reached such that tuning expenses can be reduced (e.g., no calibrations for measurement setup) and accuracy can be increased. When a minimum or maximum voltage is reached, the absolute detected voltage may be less important. In other implementations, absolute phase differences are determined by the phase correlation measurement unit 5.

Figure 6:
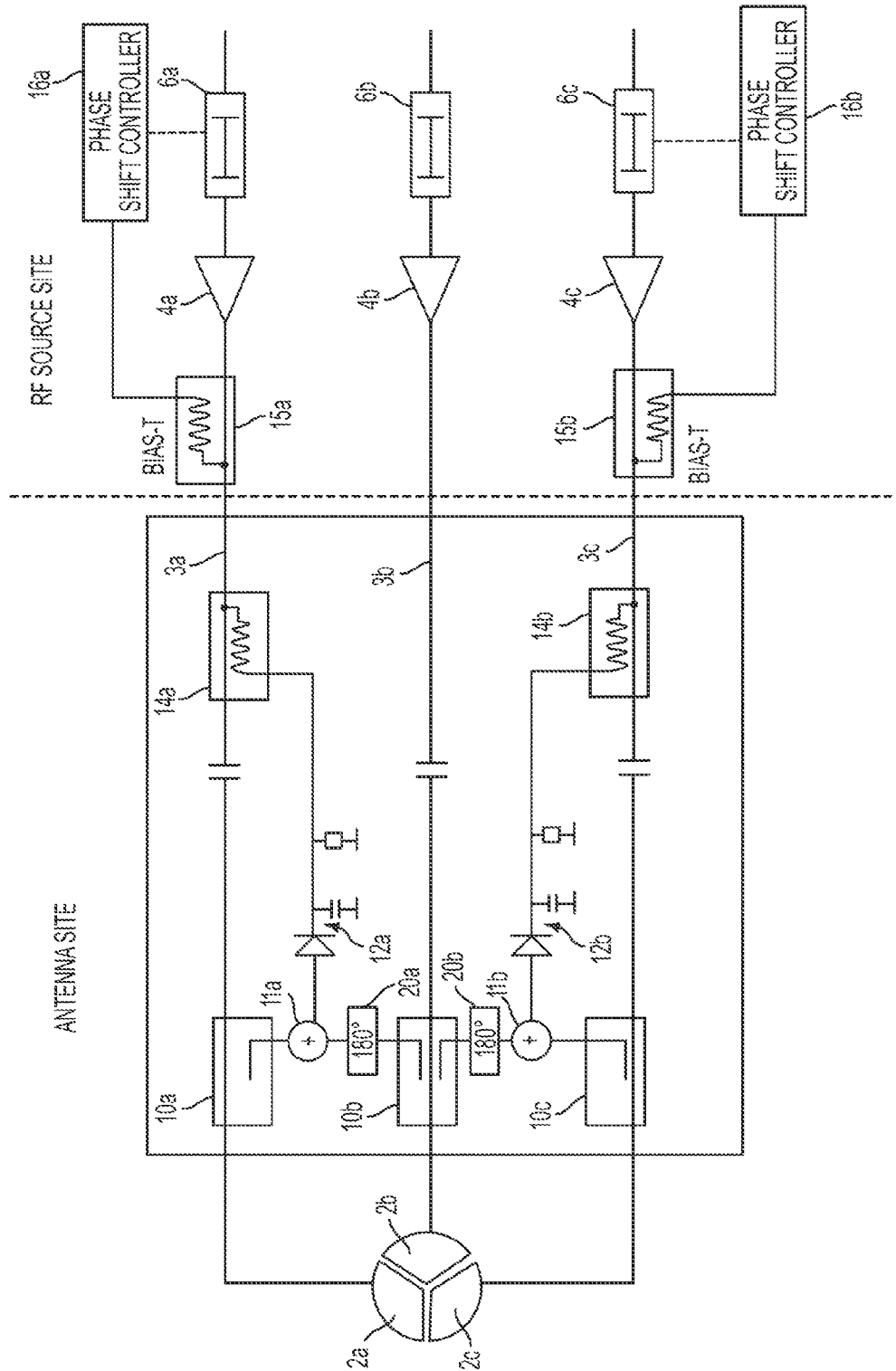
FIG. 6 is a schematic of a phase correlation measurement unit and phase shifters according to another example.

FIG. 6 schematically depicts an example of the phase correlation measurement unit 5 and phase shifters 6a, 6c in the cell site system according to another example. The phase correlation measurement unit 5 includes fixed 180° phase shifters 20a-b—one positioned between de-coupler 10a and combiner 11a, and another positioned between de-coupler 10c and combiner 11b. Including fixed 180° phase shifters 20a-b can result in minimum RF and voltage levels after phase differences are equalized (i.e., zero degrees—the intended operation mode for a single-section system), and may result in better selectivity of voltage over phase at minimum voltages. Intermodulation products can be minimized without additional filter elements. The DC voltage can be a minimum when two de-coupled RF signals have a zero degree phase difference.

Figure 7:
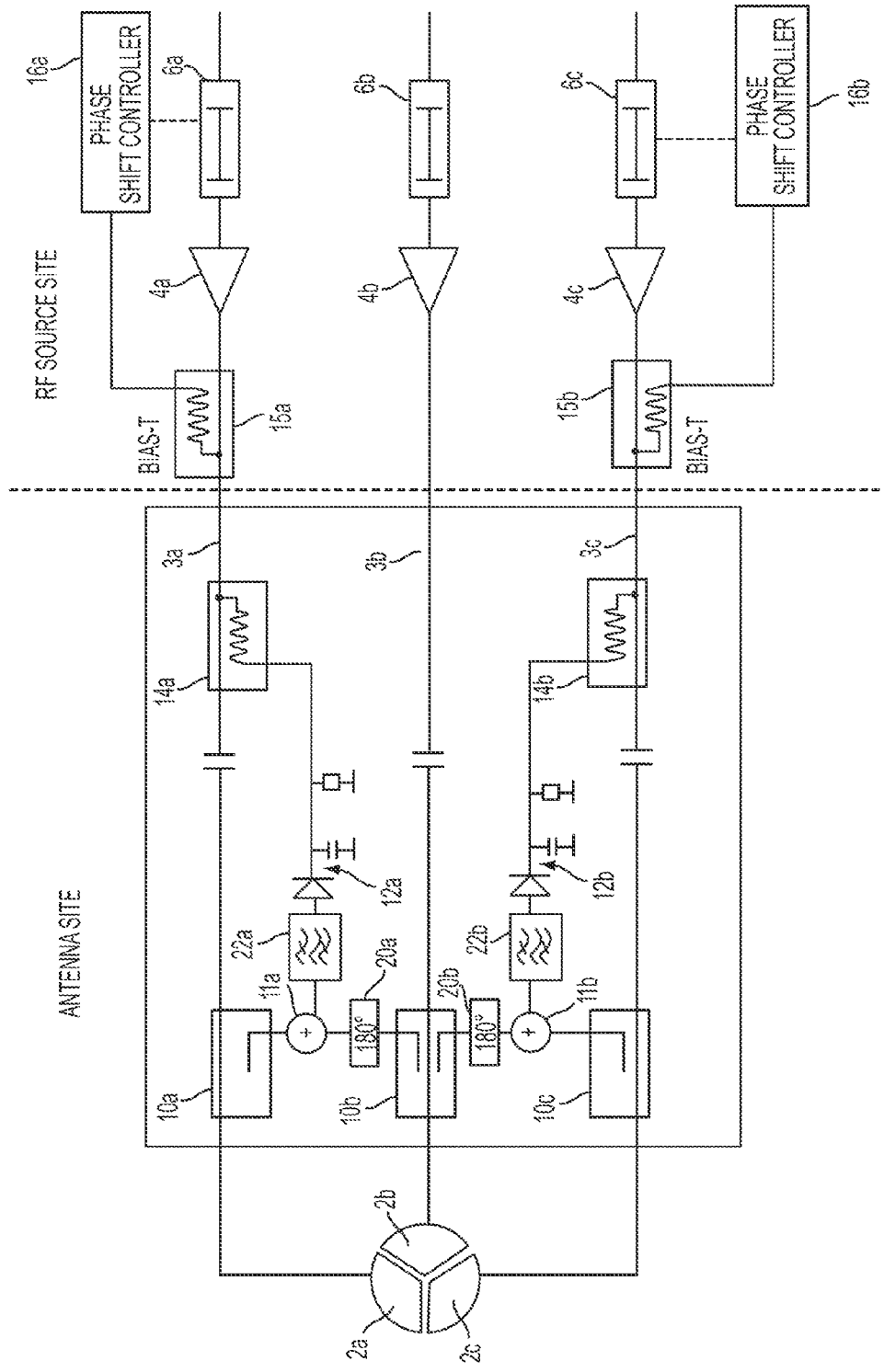
FIG. 7 is a schematic of a phase correlation measurement unit and phase shifters according to another example.

The use of filters (e.g., bandpass, lowpass, highpass) can allow for the generation of intermodulation products to be minimized, for broadband or other types of systems, that operate with correlated signals and with uncorrelated signals (i.e., multi-sector). FIG. 7 schematically depicts an example of the phase correlation measurement unit 5 and phase shifters 6a, 6c in the cell site system according to another example in which filters 22a-b filter the combined signals prior to the combined signals being rectified for minimizing intermodulation products.

In some implementations, signal processing in the phase correlation measurement unit 5 or in another location in the system can combine the de-coupled signals and analyze the combined signals. The analysis of the combined signal itself or in combination with a controlled phase-shifting can produce information usable for setting the phase shifters 6a, 6c to a position for maximum phase correlation.

Certain implementations can provide a phase correlation measurement unit that is a phase detection box requiring no external voltage supply. The phase detection box can provide a DC voltage for evaluation, which can be easier to transport and process than RF signals, and continuous supervision during system operation. Phase adjustment can be implemented using a service signal such that no test signal or switching off the service signal is necessary. Intermodulation products can be minimized in some implementation using a 180° phase shift and additional filters can be used in some implementations. Low insertion loss, high isolation between RF paths without degradation of measurement accuracy, low cost, and small size can be achieved. Phase adjustment and alignment can be performed by relative measurements (e.g., a minimum or a maximum) such that expenditures for tuning can be reduced and accuracy can be increased.

The foregoing description of the aspects, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A telecommunications system comprising:
   a phase correlation measurement unit configured to be positioned between a sectorized antenna sub-system and a remotely located radio frequency (RF) source site, the phase correlation measurement unit being coupleable to the RF source site over at least one feed line and configured for outputting signals for controlling a phase shifter at the RF source site for phase shifting downlink signals and for causing operation of the sectorized antenna sub-system as an omnidirectional antenna sub-system.

2. The telecommunications system of claim 1, wherein the phase correlation measurement unit comprises:
   de-couplers for de-coupling downlink signals from at least two feed lines;
   a combiner for combining at least two de-coupled downlink signals to provide a combined signal; and
   rectifier circuitry for producing a rectified voltage signal from the combined signal.

3. The telecommunications system of claim 2, further comprising:
   a phase shift controller at the RF source site for determining a measured voltage of the rectified voltage signal and controlling the phase shifter based on the measured voltage.

4. The telecommunications system of claim 3, wherein the phase correlation measurement unit further comprises an on-coupler for coupling the rectified voltage signal to a feed line.

5. The telecommunications system of claim 3, wherein the phase shift controller is configured for causing the phase shifter to shift a phase of a downlink signal until a maximum measured voltage is determined.

6. The telecommunications system of claim 2, wherein the phase correlation measurement unit further comprises a 180° phase shifter positioned between a de-coupler and the combiner, wherein the telecommunications system further comprises a phase shift controller at the RF source site for determining a measured voltage from the rectified voltage signal and causing the phase shifter to shift a phase of a downlink signal until a minimum measured voltage is determined.

7. The telecommunications system of claim 2, wherein the phase correlation measurement unit further comprises a filter positioned between the combiner and the rectifier circuitry for reducing or eliminating intermodulation products generated by the combined signal.

8. The telecommunications system of claim 1, wherein the phase correlation measurement unit is configured for operating in an absence of coupling with an external voltage supply.

9. The telecommunications system of claim 1, wherein the telecommunications system is switchable between a single sector mode and a multiple sector mode based on a control signal, the sectorized antenna subsystem being operable as the omnidirectional antenna sub-system in the single sector mode.

10. The telecommunications system of claim 1, wherein the phase correlation measurement unit is a module formed by an RF board, a detection board, and a metal plane positioned between the RF board and the detection board.

11. A telecommunications system, comprising:
    a phase shifter positionable at a radio frequency (RF) source site;
    antennas positionable at a sectorized antenna sub-system site communicatively coupled to RF sources at the RF source site; and
    a phase correlation measurement unit positionable at the sectorized antenna sub-system site, the phase correlation measurement unit being configured for outputting signals for controlling the phase shifter for phase shifting system signals and for causing operation of the sectorized antenna sub-system site as an omnidirectional antenna sub-system, wherein the telecommunications system is switchable between operating in an omnidirectional operation mode and a multiple sector operation mode in response to a control signal.

12. The telecommunications system of claim 11, wherein the phase correlation measurement unit comprises:
    de-couplers for de-coupling downlink signals from at least two feed lines;
    a combiner for combining at least two de-coupled downlink signals to provide a combined signal; and
    rectifier circuitry for producing a rectified signal from the combined signal, wherein the telecommunications system further comprises a phase shift controller positionable at the RF source site for determining a measured voltage from the rectified signal and controlling the phase shifter based on the measured voltage.

* * * * *